(12) United States Patent
Yue et al.

(10) Patent No.: US 11,923,930 B2
(45) Date of Patent: Mar. 5, 2024

(54) HIGH-DIMENSIONAL SIGNAL TRANSMISSION METHOD

(71) Applicant: University of Electronic Science and Technology of China, Chengdu (CN)

(72) Inventors: Guangrong Yue, Chengdu (CN); Daizhong Yu, Chengdu (CN); Lin Yang, Chengdu (CN)

(73) Assignee: University of Electronic Science and Technology of China, Chengdu (CN)

( * ) Notice: Subject to any disclaimer, the term of this patent is extended or adjusted under 35 U.S.C. 154(b) by 0 days.

(21) Appl. No.: 18/033,373

(22) PCT Filed: Apr. 29, 2021

(86) PCT No.: PCT/CN2021/090941
§ 371 (c)(1),
(2) Date: Apr. 24, 2023

(87) PCT Pub. No.: WO2022/088636
PCT Pub. Date: May 5, 2022

(65) Prior Publication Data
US 2024/0022293 A1    Jan. 18, 2024

(30) Foreign Application Priority Data
Nov. 2, 2020   (CN) .......................... 202011199804.0

(51) Int. Cl.
H04B 7/0456    (2017.01)
H04L 5/00      (2006.01)
H04L 25/03     (2006.01)

(52) U.S. Cl.
CPC ......... *H04B 7/0456* (2013.01); *H04L 5/0026* (2013.01); *H04L 25/03343* (2013.01); *H04L 25/0391* (2013.01); *H04L 2025/03426* (2013.01)

(58) Field of Classification Search
CPC ................ H04B 7/0456; H04L 5/0026; H04L 25/03343
(Continued)

(56) References Cited

U.S. PATENT DOCUMENTS 9,570,105 B1    2/2017  Mathew et al.
2018/0115912 A1*  4/2018  Gao ...................... H04L 1/0668

FOREIGN PATENT DOCUMENTS

CN    106059640 A    10/2016
CN    109639325 A    4/2019
CN    112019464 A    12/2020

OTHER PUBLICATIONS

Chunxia Bai, et al., Treatment of multi-dimensional signal based on complex wavelet-contourlet transform, Automation & Instrumentation, 2011, pp. 113-115, 118, Issue 153.

* cited by examiner

*Primary Examiner* — Leila Malek
(74) *Attorney, Agent, or Firm* — Bayramoglu Law Offices LLC

(57) ABSTRACT

A high-dimensional signal transmission method is provided. The method generates M M-dimensional first signals on the basis of M original signals and generates M M-dimensional second signals on the basis of a precoding signal and of the first signals, and finally, a transmitter sums all of the second signals and then transmits by utilizing M subchannels. As such, each subchannel carries information of the M original signals; hence, when any subchannel experiences deep fading, the deep fading is shared jointly by M signals, thus preventing the deep fading from causing a particularly severe impact on any signal. Moreover, all of the original signals can be recovered by utilizing the signals on the other subchannels, thus increasing the systematic resistance against subchannel deep fading. Meanwhile, the system
(Continued)

implements the parallel transmission of the M original signals, thus ensuring the throughput of a communication system.

3 Claims, 2 Drawing Sheets

(58) Field of Classification Search
USPC .......................................................... 375/262
See application file for complete search history.

HIGH-DIMENSIONAL SIGNAL TRANSMISSION METHOD

CROSS REFERENCE TO THE RELATED APPLICATIONS

This application is the national phase entry of International Application No. PCT/CN2021/090941, filed on Apr. 29, 2021, which is based upon and claims priority to Chinese Patent Application No. 202011199804.0, filed on Nov. 2, 2020, the entire contents of which are incorporated herein by reference.

TECHNICAL FIELD

The present invention belongs to the field of telecommunications, and in particular, relates to a high-dimensional signal transmission method.

BACKGROUND

In existing communication systems, for example, orthogonal frequency division multiplexing (OFDM), one subchannel is configured to transmit different information from other subchannels. Information of different subchannels is kept independent of each other, and mutual interference between the subchannels is suppressed as far as possible, so that the overall capacity of a communication system is improved. However, when the channel condition of a certain subchannel is poor, information transmitted by the subchannel will be lost. In the existing communication systems, various methods are used to overcome the sudden deep fading of a certain subchannel. When the subchannel corresponds to a time domain subchannel, time domain diversity is used; and when the subchannel corresponds to a frequency domain subchannel, frequency domain diversity is used. However, to ensure communication quality, traditional diversity technologies usually lead to a reduction of the overall throughput of the system.

SUMMARY

To effectively solve the contradiction between the communication quality and the overall throughput of a system, the present invention provides a high-dimensional signal transmission method. Multiple signals are regarded as a whole signal, and the whole signal is transmitted in parallel by a plurality of subchannels, so that the problem of sudden deterioration of a certain subchannel is solved while ensuring the overall throughput of the system unchanged.

The present invention provides a high-dimensional signal transmission method. In the method, a transmitter for processing and sending an original signal, a receiver for receiving and recovering the original signal, and a plurality of subchannels for the transmitter and the receiver are provided. The plurality of subchannels include time-domain, frequency-domain, space-domain and code-domain subchannels.

The high-dimensional signal transmission method includes the following steps:

step 1: generating, by the transmitter, M M-dimensional precoding signals $\alpha_1(t), \alpha_2(t), \ldots, \alpha_M(t)$, and generating, by the receiver, M M-dimensional matched signals $\beta_1(t), \beta_2(t), \ldots, \beta_M(t)$, where M is equal to the number of the subchannels, the precoding signals and the matched signals satisfy: $\beta_i^H(t)\text{diag}$ $$(\alpha_i(t)) = [\underbrace{1\ 1\ \ldots\ 1}_{M\uparrow}],$$

$\text{diag}(\alpha_i(t))$ represents a diagonal matrix composed of elements $\alpha_i(t)$, $\beta_i^H(t)$ represents conjugate transposition of $\beta_i(t)$, and $i=1, 2, 3, \ldots, M$;

step 2: generating, by the transmitter, M M-dimensional first signals $s_1(t), s_2(t), \ldots, s_M(t)$ according to M original signals $q_1(t), q_2(t), \ldots, q_M(t)$, where the original signals represent the data signals to be sent, and the generated first signals should satisfy:

$$\beta_i^H(t)\text{diag}(\alpha_i(t))s_i(t)=q_i(t)$$

step 3: generating, by the transmitter, M M-dimensional second signals $x_1(t), x_2(t), \ldots, x_M(t)$ according to the precoding signals and the first signals, where the generation method is as follows:

$$x_j(t)=\text{diag}(\alpha_j(t))s_j(t), j=1,2,\ldots,M$$

Summing up, by the transmitter, all of the second signals to obtain an M-dimensional transmission signal $$y(t) = \sum_{j=1}^{M} x_j(t),$$

and sending the transmission signal to the receiver by M subchannels, where one subchannel is used to send one dimension of the transmission signal; and step 4: sending, by the transmitter, the transmission signal y(t) to the receiver, estimating, by the receiver, the transmission signal y(t) to obtain a received signal r(t), and generating by the receiver, an estimation of M original signals according to the matched signals and the received signal, where the generation method is as follows:

$$\hat{s}_i(t)=\beta_i^H(t)r(t), i=1,2,\ldots,M$$

$\hat{s}_i(t)$ represents an estimation of an $i^{th}$ of original signal.

Further, the precoding signals and the matched signals in step 1 are time-varying signals.

According to the present invention, M M-dimensional first signals are generated according to M original signals $q_1(t), q_2(t), \ldots, q_M(t)$, M M-dimensional second signals are generated according to a precoding signal and the first signals, and finally, a transmitter sums up all of the second signals and then transmits by utilizing M subchannels. In this way, each subchannel carries information of the M original signals; hence, when any subchannel experiences deep fading, the deep fading is shared jointly by M signals, thus preventing the deep fading from causing a particularly severe impact on any signal. Moreover, all of the original signals can be recovered by utilizing the signals on the other subchannels, thus increasing the systematic resistance against subchannel deep fading. Meanwhile, the system implements the parallel transmission of the M original signals, thus ensuring the throughput of a communication system.

DETAILED DESCRIPTION OF THE EMBODIMENTS

Figure 1:
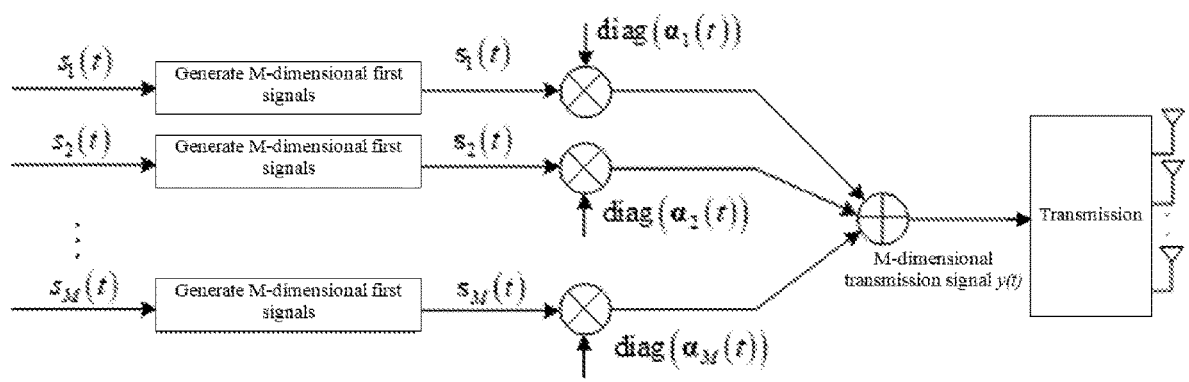
FIG. 1 is a block diagram of signal processing of a transmitter according to the present invention.

A specific embodiment of the present invention is given below with reference to block diagrams of the specification. In this embodiment, a transmitter adopts a transmitter signal processing block diagram shown in FIG. 1, the transmitter maps a bit stream into constellation signals first, and a group of original signals $q_1(t), q_2(t), \ldots, q_M(t)$ are formed by M constellation signals. In this embodiment, M=64, and the original signals are QPSK signals.

The transmitter generates M M-dimensional precoding signals $\alpha_1(t), \alpha_2(t), \ldots, \alpha_M(t)$, and the receiver generates M M-dimensional matched signals $\beta_1(t), \beta_2(t), \ldots, \beta_M(t)$. In this embodiment, $$\alpha_1(t) = vec\left(\begin{bmatrix} e^{j2\pi f_1 t}e^{j2\pi f_2 t} & e^{j4\pi f_1 t}e^{j2\pi f_2 t} & \ldots & e^{j16\pi f_1 t}e^{j2\pi f_2 t} \\ e^{j2\pi f_1 t}e^{j4\pi f_2 t} & e^{j4\pi f_1 t}e^{j4\pi f_2 t} & \ldots & e^{j16\pi f_1 t}e^{j4\pi f_2 t} \\ \vdots & \vdots & \vdots & \vdots \\ e^{j2\pi f_1 t}e^{j16\pi f_2 t} & e^{j4\pi f_1 t}e^{j16\pi f_2 t} & \ldots & e^{j16\pi f_1 t}e^{j16\pi f_2 t} \end{bmatrix}\right)$$

where $f_1$=100 kHz, $f_2$=800 kHz, and a function vec(A) indicates that columns of a matrix A are extracted and put together in order to form a new column vector.

$\alpha_i(t)=\alpha_1(t+(i-1)\Delta\tau), i=2,3,\ldots,M$ $\beta_i(t)=\alpha_i^*(t), i=2,3,\ldots,M$ where $$\Delta\tau = \frac{1}{64 \times 10^5},$$

and $\alpha_i^*(t)$ represents a vector that is obtained by conjugating each elements in the vector $\alpha_i(t)$.

The transmitter generates M M-dimensional first signals $s_1(t), s_2(t), \ldots, s_M(t)$ according to M original signals $q_1(t), q_2(t), \ldots, q_M(t)$, where the first signals satisfy:

$\beta_i^H(t)\text{diag}(\alpha_i(t))s_i(t)=q_i(t)$

The transmitter generates M M-dimensional second signals $x_1(t), x_2(t), \ldots, x_M(t)$, where the generation method is as follows:

$x_j(t)=\text{diag}(\alpha_j(t))s_j(t), j=1, 2, \ldots, M$. The transmitter sums up all of the second signals to obtain an M-dimensional transmission signal $$y(t) = \sum_{j=1}^{M} x_j(t),$$

and sends the transmission signal to the receiver by M subchannels, where one subchannel is used to send one dimension of the transmission signal.

Figure 2:
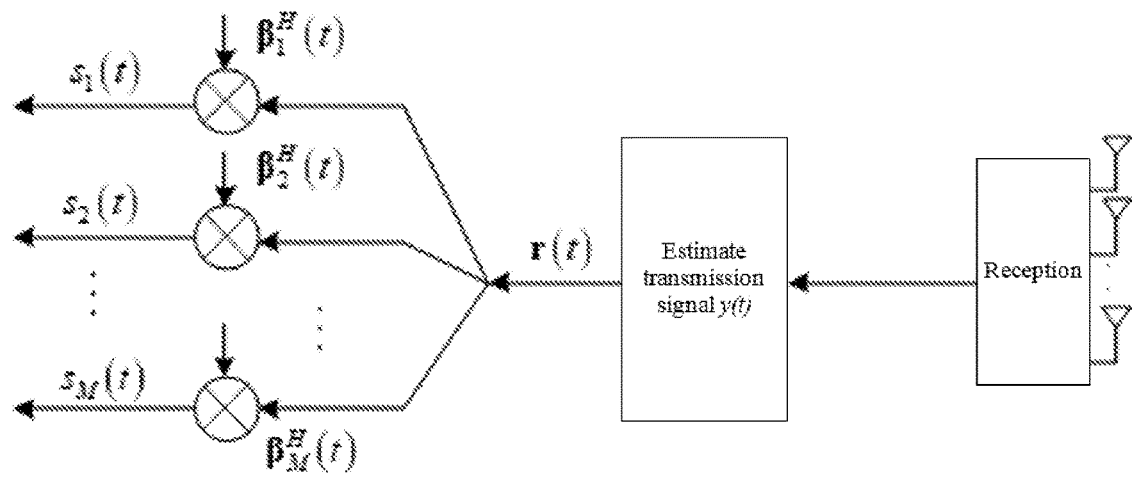
FIG. 2 is a block diagram of signal processing of a receiver according to the present invention.

The receiver adopts a receiver signal processing block diagram shown in FIG. 2. The receiver estimates the transmission signal y(t) to obtain a received signal r(t). The receiver generates an estimation of M original signals according to the matched signals and the received signal, where the generation method is as follows:

$\hat{s}_i(t)=\beta_i^H(t)r(t), i=1,2,\ldots,M$

Figure 3:
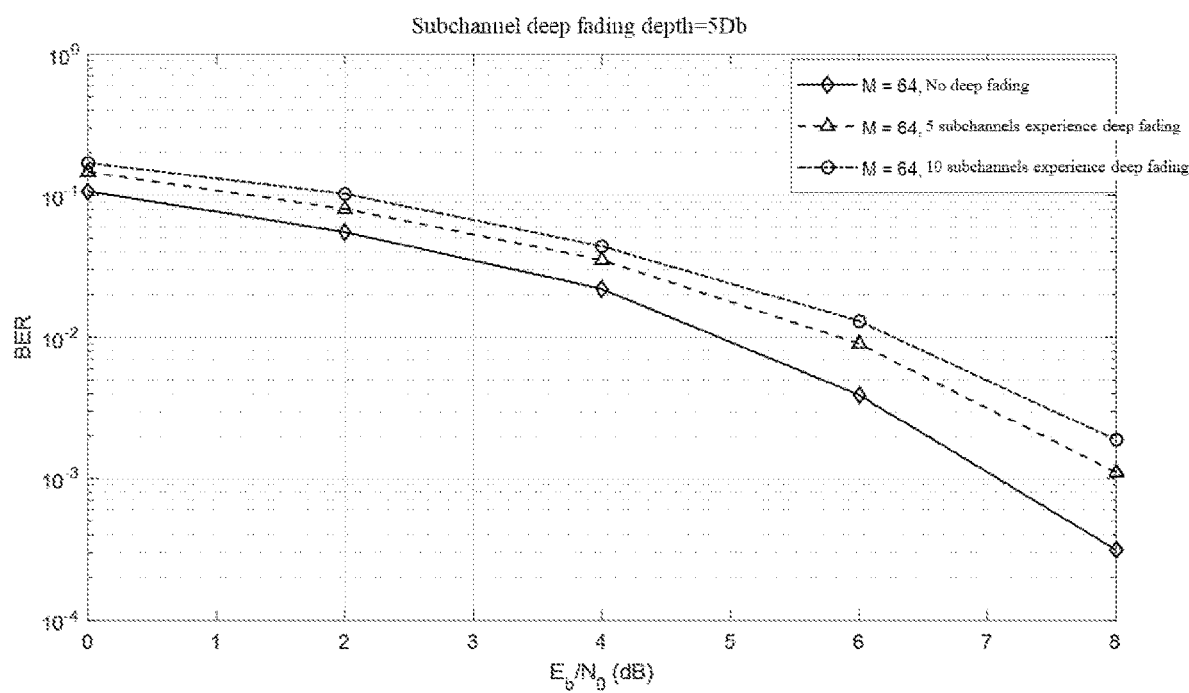
FIG. 3 is a schematic diagram of the worst-case error rate performance of a method disclosed by the present invention when different numbers of subchannels experience deep fading.

FIG. 3 simulates the worst-case error rate performance of a method provided by this embodiment when different numbers of subchannels experience deep fading, where the worst-case error rate performance refers to the error performance of a path with the worst performance in M signals. It can be seen that when 10 subchannels experience 5 dB deep fading, the worst-case performance loss is limited to be within 1.5 dB by the method provided by this embodiment, which has a gain exceeding 3.5 dB compared with the traditional method. Therefore, the method provided by this embodiment can improve the tolerance of the system on the deep fading of the subchannels while ensuring the throughput of the system.

What is claimed is:

1. A high-dimensional signal transmission method, wherein in the method, a transmitter for processing and sending an original signal, a receiver for receiving a signal and recovering the original signal, and a plurality of subchannels for the transmitter and the receiver are provided; the plurality of subchannels comprise: time domain, frequency domain, space domain and code domain subchannels; and the high-dimensional signal transmission method comprises the following steps:

step 1: generating, by the transmitter, M M-dimensional precoding signals $\alpha_1(t), \alpha_2(t), \ldots, \alpha_M(t)$, and generating, by the receiver, M M-dimensional matched signals $\beta_1(t), \beta_2(t), \ldots, \beta_M(t)$, wherein M is equal to a number of the subchannels, the precoding signals and the matched signals satisfy: $\beta_i^H(t)\text{diag}$ $$(\alpha_i(t)) = [\underbrace{1\ 1\ \ldots\ 1}_{M\uparrow}],$$

diag($\alpha_i(t)$) represents a diagonal matrix composed of $\alpha_i(t)$ elements, $\beta_i^H(t)$ represents a conjugate transposition of $\beta_i^H(t)$, and i=1, 2, 3, ..., M; wherein the transmitter is configured to generate the M-dimensional precoding signals;

step 2: generating, by the transmitter, M M-dimensional first signals $s_1(t), s_2(t), \ldots, s_M(t)$ according to M original signals $q_1(t), q_2(t), \ldots, q_M(t)$, wherein the transmitter is further configured to generate the M-dimensional first signals, and wherein the original signals represent to-be-sent data signals, and the generated first signals satisfy:

$\beta_i^H(t)\text{diag}(\alpha_i(t))s_i(t)=q_i(t)$ step 3: generating, by the transmitter, M M-dimensional second signals $x_1(t), x_2(t), \ldots, x_M(t)$ according to the precoding signals and the first signals, and wherein the transmitter is further configured to generate the M-dimensional second signals, and wherein a generation method of the transmitter is as follows:

$x_j(t)=\text{diag}(\alpha_j(t))s_j(t), j=1,2,\ldots,M$ summing up, by the transmitter, all of the second signals to obtain an M-dimensional transmission signal $$y(t) = \sum_{j=1}^{M} x_j(t),$$

and sending the transmission signal to the receiver by M subchannels, wherein one subchannel is used to send one dimension of the transmission signal, wherein the transmitter is further configured to sum up all of the second signals, and wherein the transmitter is further configured to use the M subchannels to improve communication quality and maintain throughput; and step 4: sending, by the transmitter, the transmission signal y(t) to the receiver, estimating, by the receiver, the transmission signal y(t) to obtain a received signal r(t), and generating by the receiver, an estimation of the M original signals according to the matched signals and the received signal, wherein the receiver is configured to obtain the received signal and in response to the obtained received signal generate the estimation of the M original signals, and wherein the generation method of the configured receiver is as follows:

$$\hat{s}_i(t)=\beta_i^H(t)r(t), i=1,2,\ldots,M$$

$\hat{s}_i(t)$ represents an estimation of an $i^{th}$ original signal.

2. The high-dimensional signal transmission method according to claim 1, wherein the precoding signals and the matched signals are time-varying signals.

3. A system for high-dimensional signal transmission, the system comprising:

a transmitter for processing and sending an original signal; and a receiver for receiving a signal and recovering the original signal, wherein a plurality of subchannels for the transmitter and the receiver are provided; the plurality of subchannels comprising: time domain, frequency domain, space domain and code domain subchannels; wherein the transmitter and receiver are configured to perform a high-dimensional signal transmission method comprising the following steps:

step 1: generating, by the transmitter, M M-dimensional precoding signals $\alpha_1(t), \alpha_2(t), \ldots, \alpha_M(t)$, and generating, by the receiver, M M-dimensional matched signals $\beta_1(t), \beta_2(t), \ldots, \beta_M(t)$, wherein M is equal to a number of the subchannels, the precoding signals and the matched signals satisfy:

$$\beta_i^H(t)\mathrm{diag}(a_i(t)) = \left[\underbrace{1\ 1\ \ldots\ 1}_{M\uparrow}\right],$$

diag($\alpha_i$(t)) represents a diagonal matrix composed of $a_i$(t) elements, $\beta_i^t$(t) represents a conjugate transposition of $\beta_i$(t), and i=1, 2, 3, ..., M, wherein the transmitter is configured to generate the M-dimensional precoding signals;

step 2: generating, by the transmitter, M M-dimensional first signals $s_1(t), s_2, \ldots, s_M(t)$ according to M original signals $q_1(t), q_2(t), \ldots, q_M(t)$, wherein the transmitter is further configured to generate the M-dimensional first signals, and wherein the original signals represent to-be-sent data signals, and the generated first signals satisfy:

$$\alpha_i^H(t)\mathrm{diag}(\alpha_i(t))s_i(t)=q_i(t)$$

Step 3: generating, by the transmitter, M M-dimensional second signals $x_1(t), x_2(t), \ldots, x_M(t)$ according to the precoding signals and the first signals, and wherein the transmitter is further configured to generate the M-dimensional second signals, and wherein a generation method of the transmitter is as follows:

$$x_j(t)=\mathrm{diag}(\alpha_j(t))s_j(t), j=1, 2, \ldots, M$$

summing up, by the transmitter, all of the second signals to obtain an M-dimensional transmission signal $$y(t) = \sum_{j=1}^{M} x_j(t),$$

and sending the transmission signal to the receiver by M subchannels, wherein one subchannel is used to send one dimension of the transmission signal, wherein the transmitter is further configured to sum up all of the second signals, and wherein the transmitter is further configured to use the M subchannels to improve communication quality and maintain throughput; and step 4: sending, by the transmitter, the transmission signal y(t) to the receiver, estimating, by the receiver, the transmission signal y(t) to obtain a received signal r(t), and generating by the receiver, an estimation of the M original signals according to the matched signals and the received signal, wherein the receiver is configured to obtain the received signal and in response to the obtained received signal generate the estimation of the M original signals, and wherein the generation method of the configured receiver is as follows:

$$\hat{s}_i(t)=\beta_i^H(t)r(t), i=1,2,\ldots,M$$

$\hat{s}_i(t)$ represents an estimation of an $i^{th}$ original signal.

* * * * *